Patented Mar. 21, 1944

2,344,733

UNITED STATES PATENT OFFICE 2,344,733

MOLDING COMPOSITION

Kurt E. Ripper, Bronxville, N. Y., assignor to American Cyanamid Company, New York, N. Y., a corporation of Maine No Drawing. Application January 28, 1941, Serial No. 376,339

16 Claims. (Cl. 260—39)

This invention relates to aminoplastic materials having unusually high mechanical strength, especially impact strength.

It is well known that so far it has not been possible to produce an aminoplastic impact material in spite of an urgent need for such a material in order to utilize the outstanding properties such as odorlessness, tastelessness, chemical inertness, hardness, arc resistance, and heat resistance of aminoplastic resins.

An object of this invention is to provide aminoplastic molding compositions which give moldings having high mechanical strength such as impact strength.

Another object of my invention is to prepare aminoplastic moldings which contain a reinforcing material so intimately associated with the aminoplastic resin that there is substantially no separation even under breaking stresses.

These and other objects are attained by impregnating glass cloth (consisting solely of glass fibers or comprising cellulosic fibers) with an aminoplastic resin syrup, dividing it into small particles suitable for molding either before or after drying and partially polymerizing the resin, or in between the drying and polymerizing step. Dividing the particles of cloth into small particles may precede the impregnation when cellulosic fibers are present in the glass cloth.

The following examples in which the proportions are in parts by weight are given by way of illustration and not in limitation.

Example 1

Sheets of glass cloth (0.01 inch thick) are impregnated with a melamine-formaldehyde resin syrup (resin "A"). The impregnated glass cloth is dried at about 20° C. for 90 minutes and the resin is partially polymerized by heating in an oven at 75–80° C. for about 30 minutes. The glass cloth is preferably maintained in a horizontal position because of the tendency of the resin to run off of the sheet in a vertical position. The impregnated material contains about 46% of resin solids and about 5.4% of volatile material. The percent of volatile material is the loss in weight expressed in percent after a sample is heated at 150° C. for 25 minutes. After the partial polymerization the impregnated glass cloth is cut into particles approximately ½ inch square, thereby producing a molding composition which may be placed in a mold and molded at a temperature of about 150–155° C. under a pressure of about 3500 pounds per square inch for about 3 minutes. The resulting molded product has a thickness of about 0.11 inch and has a shiny glossy resin surface. This material shows an impact strength of 90.5 cm. kg./cm.$^2$ determined with the dynstat machine. The impact strength of similar cellulosic fiber filled materials is about 8–12 cm. kg./cm.$^2$ while the impact strength of phenol-formaldehyde (high impact) molding materials is about 41–58 cm. kg./cm.$^2$. In view of this it is apparent that I have produced a material which has an impact strength considerably higher than the high impact materials now widely used.

Example 2

Sheets of glass cloth (0.004 inch thick) are impregnated with a melamine-formaldehyde resin syrup (resin "A") and dried for about 90 minutes at 20° C. The dried impregnated cloth is heated in an oven at about 75–80° C. for approximately 20 minutes to partially polymerize the resin. The impregnated material contains about 62% of resin solids including about 6.8% of volatile material. The impregnated material is chopped into small pieces, for example, about ½ inch square, thereby producing a molding composition which may be placed in a dish mold and molded at about 150–155° C. under a pressure of 3500 pounds per square inch for about 3 minutes. A substantially translucent molded dish about 0.11 inch thick is obtained which has a resinous surface. The dish is quite homogeneous and even when cut the cross-section shows an entirely homogeneous distribution of the resin and glass cloth. This molded material has an impact strength of about 107 cm. kg./cm.$^2$.

A similar molded material produced according to the same procedure except that it is molded under a pressure of 2300 pounds per square inch has an arc resistance of about 133 seconds (A. S. T. M. method: D–495–38T).

Example 3

Glass cloth (0.004 inch thick) is impregnated with a melamine-formaldehyde resin syrup (resin "A") and finely ground cotton flock is spread on the wet resin surface on both sides of the cloth. This composite material is dried at 20° C. for about 90 minutes and the resin is partially polymerized at 75–80° C. for 20 minutes. The partially polymerized material contains about 20% of glass cloth, 30% of cotton flock and about 50% resin solids. The impregnated material is cut into small pieces about ½ inch square and molded at 150–155° C. under a pressure of about 3500 pounds per square inch for approximately 3 minutes. The molded piece which is obtained has an impact strength of about 45–60 cm. kg./cm.² Products made according to this example will vary in mechanical strength quite considerably as the ratio of cellulosic filler to glass cloth is varied and also to a somewhat lesser extent as the resin content is varied. The proportions should be adjusted so that the cellulosic filler will not take up so much resin from the glass cloth that the latter is not properly impregnated.

*Example 4*

Sheets of glass cloth (0.004 inch thick) and sheets of paper are impregnated with melamine-formaldehyde resin syrup (resin "A") and the glass cloth is placed in between two paper sheets. Any excess resin is then removed and the impregnated material is dried at about 20° C. for 90 minutes and the resin impregnum is partially polymerized at 75–80° C. for 70 minutes. The material thus obtained contains about 60% of resin solids and about 6.8% of volatile material. It is cut into pieces about ¾ inch square and molded as set forth in the preceding example to produce moldings having an average impact strength of about 50–60 cm. kg./cm.²

*Example 5*

Sheets of glass cloth (0.004 inch thick) and a thin cotton cloth (100 square inches weighing approximately 2 grams) are impregnated with a melamine-formaldehyde resin syrup (resin "A"), and then the cotton cloth is applied to both sides of the glass cloth. The material is then dried at 20° C. for 20 minutes and the resin partially polymerized at 75–80° C. for 90 minutes, thereby providing a composite product containing a mixture of cellulosic fibers and glass fibers, i. e., about 14% glass fibers and 16% cotton fibers, together with about 70% resin solids having a volatile content of about 7.9%. The material is cut or shredded into particles about ½ inch square and molded under the same conditions as described in Example 3. The molded articles thus produced are translucent with a somewhat cloudy "mother of pearl" effect. The average impact strength of these products is about 30–45 cm. kg./cm.²

Another extremely valuable embodiment of my invention comprises the impregnation of glass cloth containing cellulosic fibers together with the glass fibers. By this means it is possible to obtain products which have an excellent bond between the resin and the glass fiber inasmuch as the cellulosic fibers, as is well known, appears to have a strong affinity for aminoplastic resins, and in fact, may react therewith. Thus by utilizing a mixed glass fiber-cellulosic fiber cloth, the resin used for the impregnation is more nearly integrally bound to the non-reactive glass fibers. This embodiment of my invention includes the use of several types of materials. Of these materials one contains a mixture of glass fibers and cellulosic fibers which are interwoven. Similarly, fabrics which contain a mixture of cotton threads in either or both the warp and the woof and which may contain a different number of one kind of thread in the warp from that in the woof may be used. Such variations provide materials having particular properties rendering molding compositions produced therefrom especially suitable for specific purposes. Still another type of cloth which may be used is one which contains threads which include both glass fibers and cotton fibers spun together. Mixtures of the various fabrics may also be used. Furthermore, the glass cloth fabrics may also contain fibers other than cellulosic and glass fibers.

Although the highest impact strength is usually obtained with straight glass cloth, the use of a mixed cotton-glass fabric has other specific advantages. One of these advantages is that the glass cloth containing cellulosic fibers can be cut, chopped or shredded by any suitable method, placed in a mixer with the resin syrup and the impregnated material dried and polymerized. As to the quality of the finished molding the high affinity of the aminoplastic resin to the cellulosic fiber prevents any separation of the resin and the cloth which is common with certain types of pheno-plastic-textile mixtures, thus enabling the molding of intricately shaped moldings.

A modification of the process described in Examples 4 and 5 comprises the impregnation of the cellulosic material with an aminoplastic resin syrup, preferably a relatively dilute syrup, followed by drying and partially polymerizing the resin in the same general manner as described above. This impregnated material is then impregnated again with an aminoplastic resin syrup and assembled with glass cloth which has also been impregnated with an aminoplastic resin syrup. The process is then carried out just as set forth in the above examples. This modification of my process is of advantage in reducing the tendency of the cellulosic fibers to withdraw the impregnated resin from the glass cloth.

Resin "A" may be prepared by reacting melamine and formaldehyde in any suitable manner. The particular resin used in the preceding examples may be prepared by the following procedure:

The pH of 240 parts of formalin (an aqueous solution containing 37% formaldehyde by weight) is adjusted with caustic soda to about 6.80 (glass electrode). 126 parts of melamine are added to the formalin and the mixture is reacted at about 65° C. for approximately 70 minutes. At the end of this reaction the pH is about 7.50 (glass electrode). The resin remains liquid for several hours but turns into a pasty mass on standing for example, about 24–48 hours depending upon the temperature. This paste becomes liquid again by warming up to about 60° C.

Other aminoplastic resins as well as various mixtures of any of these resins may be employed in place of those used in the above examples and such mixtures may be produced by mixing the separate resins or by mixing other aldehyde reactive materials before or during condensation with an aldehyde. Examples of the various resins which may be used are amino-triazine-aldehyde resins such as melamine-formaldehyde resins, dicyandiamide-aldehyde resins, melamine-modified dicyandiamide-formaldehyde resins, thiourea-aldehyde resins, urea-aldehyde resins, urea-thiourea-aldehyde resins, melamine-urea-formaldehyde resins, etc. Melamine-modified dicyandiamide-formaldehyde resins may be prepared by reacting dicyandiamide and a minor proportion of melamine with an aldehyde such as formaldehyde to produce a clear syrup as described in my copending applications Serial Nos. 311,935, 328,741 and 331,161. Other resins may also be prepared as described in my copending application Serial No. 351,915. If desirable, any of the foregoing resins may be modified with minor proportions of phenol, cresol and other phenolic substances. In each instance condensation products of formaldehyde are considered to be the most suitable although formaldehyde polymers as well as other aldehydes may also be used. Plasticizing and lubricating substances such as fatty acid derivatives either in dissolved or emulsified form can be incorporated with the aminoplastic resin.

My investigations have indicated that it is advisable to have a condensation product which is of a colloidal nature so that the resin will adhere to the glass in the proper manner but that colloidal nature must not impair the quality of the molded piece. Furthermore, the condensation product must be capable of curing easily and preferably without the addition of curing catalysts. Generally I prefer not to use any curing catalyst since it is rather difficult to only partially polymerize the resins if any curing catalyst be present. However, if a curing catalyst be employed it should be a latent catalyst and be substantially inactive at the temperatures used in the partial polymerization. Moreover, it is obvious that the molding composition must have the necessary stability for storage purposes. In view of all of this it appears that melamine-formaldehyde resins or melamine-modified dicyandiamide-formaldehyde resins are probably the most suitable for my purposes.

It is generally desirable to partially polymerize the resin impregnum by subjecting it to a temperature of about 50-100° C. for a period of about ½-4 hours. This partial polymerization is not essential and it may be omitted entirely or in part. If the partial polymerization step is omitted the impregnated glass cloth as well as any other impregnated material which is to be used is merely dried and divided into small particles.

Glass cloth (plain or mixed with cellulosic fibers) having various thicknesses may be substituted for that used in the above examples. Glass cloth is commercially available in thicknesses ranging from about 0.002 to 0.015 inch, but the use of glass cloth of other dimensions is also within the scope of this invention. It has generally been found that glass cloth having a thickness of around 0.004 inch is well suited for the purposes of this invention. The glass cloth should be divided into particles of such dimensions that its woven structure is retained. The proper size of the particles is dependent primarily upon the type of fiber (filament or staple), on the thickness of the cloth, and on the presence or absence of cellulosic fibers. When cellulosic fibers are present, they tend to prevent the disintegration of the woven structure into the single glass fiber threads and therefore smaller particles may be used than when only glass fibers are present in the cloth. On the other hand, the particle size should not be too large lest difficulties in the flowing properties of the composition during the molding should occur. Therefore sizes of about ⅛ inch to about ¾ inch square are the most favorable ones.

Any paper or cloth containing cellulosic fibers may be utilized according to my invention. If it be desirable to have the cellulosic fibers very intimately associated with the glass fibers of the glass cloth, the use of thin sheets of cellulosic material is advantageous. The processes of Examples 3-5 inclusive may be carried out utilizing any suitable number of layers of glass cloth and cellulosic fibers, the latter being either as individual fibers, woven into cloth or fabricated into paper. In some instances it may be desirable to place one layer of cellulosic material between two layers of glass cloth. Furthermore, a plurality of layers of glass cloth may be alternately laminated with cellulosic material. It is generally found to be advantageous from a practical standpoint to employ only a few layers of material.

In some instances I have found that it is convenient to impregnate the glass cloth with a resin different from the impregnating resin used for the paper or fabric cloth with which the glass cloth is associated. For example, the glass cloth may be bonded with a dicyandiamide-formaldehyde resin, preferably modified with a minor proportion of melamine and the paper or fabric to be used is impregnated with a melamine-formaldehyde resin, a urea-formaldehyde resin, etc.

Desirable products may also be produced by mixing small particles of glass cloth, preferably containing cellulosic fibers and optionally impregnated with an aminoplastic resin with a conventional aminoplastic molding powder and utilizing the resulting mixture in the same general manner as described above for the production of molded objects having high mechanical strength.

The term "glass cloth" as used herein is intended to cover any form of woven or knitted materials. Both types of glass fibers, continuous filaments and staple fibers, can be used for the glass cloth. The term "glass" is intended to cover all types of glass including the so-called silica glass.

My compositions containing woven glass fabrics are useful for producing moldings without the brittleness of the aminoplastic products known so far, as for instance: foor containers, dishes, instrument housings, hair-driers, vacuum cleaners, electrical fittings and covers, in a word, any application where heavy duty wear is required. The high shock resistance of my molded articles renders them particularly suitable for use in the manufacture of articles subject to shock.

Obviously many modifications and variations in the compositions and processes described above may be made without departing from the spirit and scope of the invention as defined in the appended claims.

I claim:

1. A process of producing heat-setting molding compositions, moldings of which have high mechanical strength, which comprises impregnating glass cloth with an aminoplastic resin syrup, drying and dividing the impregnated cloth into small particles having an area between that of a ⅛ inch square and about a ¾ inch square.

2. A process of producing heat-setting molding compositions, moldings of which have high mechanical strength, which comprises impregnating glass cloth with an aminoplastic resin syrup, drying and partially polymerizing said resin, and dividing the impregnated cloth into small particles having an area between that of a ⅛ inch square and about a ¾ inch square.

3. A process of producing heat-set moldings having high mechanical strength, which comprises impregnating glass cloth with an aminoplastic resin syrup, drying and partially polymerizing said resin, dividing the impregnated cloth into small particles and consolidating the particles having an area between that of a ⅛ inch square and about a ¾ inch square with heat and pressure.

4. A process of producing heat-set moldings having high mechanical strength, which comprises impregnating glass cloth comprising cellulosic fibers, with an aminoplastic resin syrup, drying and partially polymerizing said resin, dividing the impregnated cloth into small particles having an area between that of a ⅛ inch square and about a ¾ inch square and consolidating the particles with heat and pressure.

5. A process of producing heat-setting molding compositions, moldings of which have high mechanical strength, which comprises impregnating glass cloth with an aminoplastic resin syrup, and intimately associating it with an aminoplastic resin-impregnated cellulosic material, drying and partially polymerizing said resin and dividing the product thus produced into small particles having an area between that of a ⅛ inch square and about a ¾ inch square.

6. A process of producing heat-setting molding compositions, moldings of which have high mechanical strength, which comprises impregnating glass cloth with an aminoplastic resin syrup, and intimately associating it with aminoplastic resin-impregnated fabricated cellulosic material, drying and partially polymerizing said resin and dividing the product thereof into small particles.

7. A process of producing heat-setting molding compositions, moldings of which have high mechanical strength, which comprises impregnating glass cloth with an aminoplastic resin syrup, intimately associating it will cellulosic fibers, drying and partially polymerizing said resin and dividing the product thereof into small particles having an area between that of a ⅛ inch square and about a ¾ inch square.

8. A process of producing heat-setting molding compositions, moldings of which have high mechanical strength, which comprises impregnating glass cloth with a melamine-formaldehyde resin syrup, drying and dividing the impregnated cloth into small particles having an area between that of a ⅛ inch square and about a ¾ inch square.

9. A process of producing heat-set moldings having high mechanical strength, which comprises impregnating glass cloth with a melamine-formaldehyde resin syrup, drying and partially polymerizing said resin, dividing the impregnated cloth into small particles having an area between that of a ⅛ inch square and about a ¾ inch square and consolidating the particles with heat and pressure.

10. A heat-setting molding composition suitable for the production of moldings having a high mechanical strength comprising small particles having an area between that of a ⅛ inch square and about a ¾ inch square of glass cloth impregnated with a polymerizable aminoplastic resin.

11. A heat-setting molding composition suitable for the production of moldings having a high mechanical strength comprising small particles having an area between that of a ⅛ inch square and about a ¾ inch square of glass cloth comprising cellulosic fibers impregnated with a polymerizable aminoplastic resin.

12. A heat-setting molding composition suitable for the production of moldings having a high mechanical strength comprising small particles having an area between that of a ⅛ inch square and about a ¾ inch square of glass cloth together with cellulosic fibrous materials, impregnated with a polymerizable aminoplastic resin.

13. A heat-setting molding composition suitable for the production of moldings having a high mechanical strength comprising small particles having an area between that of a ⅛ inch square and about a ¾ inch square of glass cloth impregnated with a melamine-formaldehyde resin.

14. Heat-set molded articles having high mechanical strength consolidated by heat and pressure comprising small particles having an area between that of a ⅛ inch square and about a ¾ inch square of glass cloth impregnated with an aminoplastic resin.

15. Heat-set molded articles having high mechanical strength consolidated by heat and pressure comprising small particles having an area between that of a ⅛ inch square and about a ¾ inch square of glass cloth impregnated with a melamine-formaldehyde resin.

16. Heat-set molded articles having high mechanical strength consolidated by heat and pressure comprising small particles having an area between that of a ⅛ inch square and about a ¾ inch square of glass cloth comprising cellulosic fibers impregnated with a melamine-formaldehyde resin.

KURT E. RIPPER.

CERTIFICATE OF CORRECTION.

Patent No. 2,344,733.  March 21, 1944.

KURT E. RIPPER.

It is hereby certified that error appears in the printed specification of the above numbered patent requiring correction as follows: Page 2, second column, line 46, for "The" read --This--; page 3, second column, line 39, for "foor" read --food--; page 3, second column, lines 74 and 75, strike out "and consolidating the particles" and insert the same before "with", page 4, first column, line 1; and that the said Letters Patent should be read with this correction therein that the same may conform to the record of the case in the Patent Office.

Signed and sealed this 16th day of May, A. D. 1944.

(Seal)

Leslie Frazer
Acting Commissioner of Patents.